United States Patent
Pakendorf

[15] 3,680,316
[45] Aug. 1, 1972

[54] FLAT LIFTING FAN UNIT

[72] Inventor: Horst Pakendorf, Ritterhude, Germany

[73] Assignee: Vereinigte Flugtechnische Werke-Fokker Gesellschaft mit beschrankter Haftung, Bremen, Germany

[22] Filed: Aug. 27, 1970

[21] Appl. No.: 67,535

[30] Foreign Application Priority Data

Sept. 20, 1969 Germany............P 19 47 730.6

[52] U.S. Cl..................60/269, 60/39.31, 244/23 A, 244/54
[51] Int. Cl...........................F02k 3/04, F02k 11/00
[58] Field of Search.......60/226, 39.31, 269; 244/52, 244/54, 55, 12 A, 12 B, 23 A, 23 B

[56] References Cited

UNITED STATES PATENTS 3,084,888  4/1963  Hertel.........................244/23 B
3,383,074  5/1968  Coplin..........................244/55

Primary Examiner—Douglas Hart
Attorney—Spencer & Kaye

[57] ABSTRACT

A lifting fan unit for use in VTOL aircraft and composed of a lifting fan, a blade tip turbine connected to the blades of the fan and a gas turbine connected to produce a gas stream which drives the blade tip turbine, all of these elements being mounted in a single housing which supports the gas turbine so that its axis of rotation is approximately perpendicular to the axis of rotation of the fan and is approximately tangential to the periphery of the portion of the housing which houses the fan, the interior of the housing being configured for directing the gas stream produced by the gas turbine against the buckets of the blade tip turbine and the exterior of the housing including a portion for mounting the housing on a support structure.

3 Claims, 2 Drawing Figures

INVENTOR.
Horst Pakendorf

FLAT LIFTING FAN UNIT

BACKGROUND OF THE INVENTION

The present invention relates to a lifting fan and a gas turbine to drive it via a blade tip turbine, preferably for aircraft capable of vertical take-off and landing.

When designing a drive system for vertical take-off aircraft it is necessary to determine the manner in which the required lifting thrust is to be produced and where the components required for this purpose are to be located. The significant considerations for the evaluation of different solutions are safety upon the occurrence of malfunctions, weight balance, ease of installation and fuel consumption. The lifting thrust for vertical take-off aircraft can generally be produced by propellers, lifting drives or lift fans. When installing lifting drives in modern transport aircraft safety considerations require that they be composed of a plurality of lifting units. These lifting units may be housed in the fuselage, or in the area below the fuselage, or in the wings. These installation requirements demand special structural configurations for the lifting units to be installed.

U.S. Pat. No. 2,973,166 discloses lift fans which are installed in the wing of an aircraft and which are driven via blade tip turbine buckets during hovering flight by cruising drive systems.

Upon completion of the hovering phase and transition to normal aerodynamically supported forward flight, the lifting fans are turned off and the thrust of the cruising drive systems is utilized for producing the forward thrust. Similar arrangements of lift fans which are driven by cruising drive systems via blade tip turbines are disclosed in French Pat. No. 1,320,875 and German Published Patent application No. 1,092,311. Furthermore, French Pat. No. 1,335,940 discloses a drive system for generating lifting thrust in which the pressurized gas required for driving the blade tip turbines is fed to the individual lifting fans by two cruising drive systems via distributor lines.

All of the above-mentioned systems have in common that the energy required to operate the lifting fans is furnished by one or a plurality of cruising drive systems whose exhaust gases are fed, either directly or via distributor lines, to drive the blade tip turbines.

The principal drawback of these known arrangements is that the cruising drive systems or systems must be overdimensioned; and this is so for two reasons. Firstly, hovering flight, particularly with VTOL transport aircraft, requires a substantially greater output by the gas generator than is required for the maintenance of forward thrust during cruising flight. Secondly, the gas generator must be designed on the basis of cruising flight requirements, particularly for longer life and less fuel consumption.

A further drawback results from the presence of distributor lines between the drive system and the blade tip turbine of the lifting fan. These lines add a substantial amount of weight to the system and require additional space particularly because of the thick-walled heat insulation of the hot gas line and the multiple-wall design which the tubes must have for safety reasons.

It has thus far been generally thought that the technique of supplying lifting units from a plurality of gas generators via distributor lines represented a particular advantage with respect to the safety of the aircraft in the hovering phase. When one of the gas generators malfunctions, the remaining driving power can be distributed to the entirety of the lifting fans so that the total lifting thrust would be reduced only by the amount supplied by the one malfunctioning gas generator. This concept is based on the assumption that the lifting fan itself will not malfunction, which assumption is not totally justified, particularly as regards civilian aircraft.

If the lifting fan were driven directly by the associated gas generator and if one gas generator were to malfunction, the oppositely disposed drive system would also have to be shut down in order to maintain the momentum equilibrium of the aircraft, so that the total lifting thrust would be reduced by twice the amount produced by the malfunctioning drive system. However, if it is considered that, in addition to the gas generator, the lifting fan can also malfunction, it is clear that in a distributor line arrangement the malfunction of one lifting fan will also require the shutting down of the opposite fan. Thus the same reduction in the lifting thrust results for both arrangements of lifting fans, with and without distributor lines from the gas generators, when one gas generator or lifting fan malfunctions, i.e. the arrangement employing distributor lines has no advantage over the other arrangement as regards dependability.

SUMMARY OF THE INVENTION

It is an object of the present invention to avoid the above-mentioned drawbacks and to develop a lifting thrust unit which has the lowest possible weight and height.

Another object of the invention is to provide, for the generation of lifting thrust, a drive assembly which can preferably be accommodated in a limited space in the area below the fuselage of a transport aircraft. These and other objects according to the invention are essentially achieved by disposing the gas turbine, the fan, and of course the blade tip turbine in a common housing which supports the gas turbine so that its axis of rotation is approximately perpendicular to the axis of rotation of the fan blades and is approximately tangential to the periphery of the housing portion which houses the fan. The interior of the housing is shaped for guiding the gas stream produced by the gas turbine against the blade tip turbine. This arrangement, in addition to leading to an extremely thin structure, permits the production of a gas stream which flows in the optimum direction for driving the blade tip turbine. The blade tip turbine is essentially a plurality of turbine buckets mounted on the extremities of the fan blades.

DESCRIPTION OF THE PREFERRED EMBODIMENTS

Figures 1, 2:
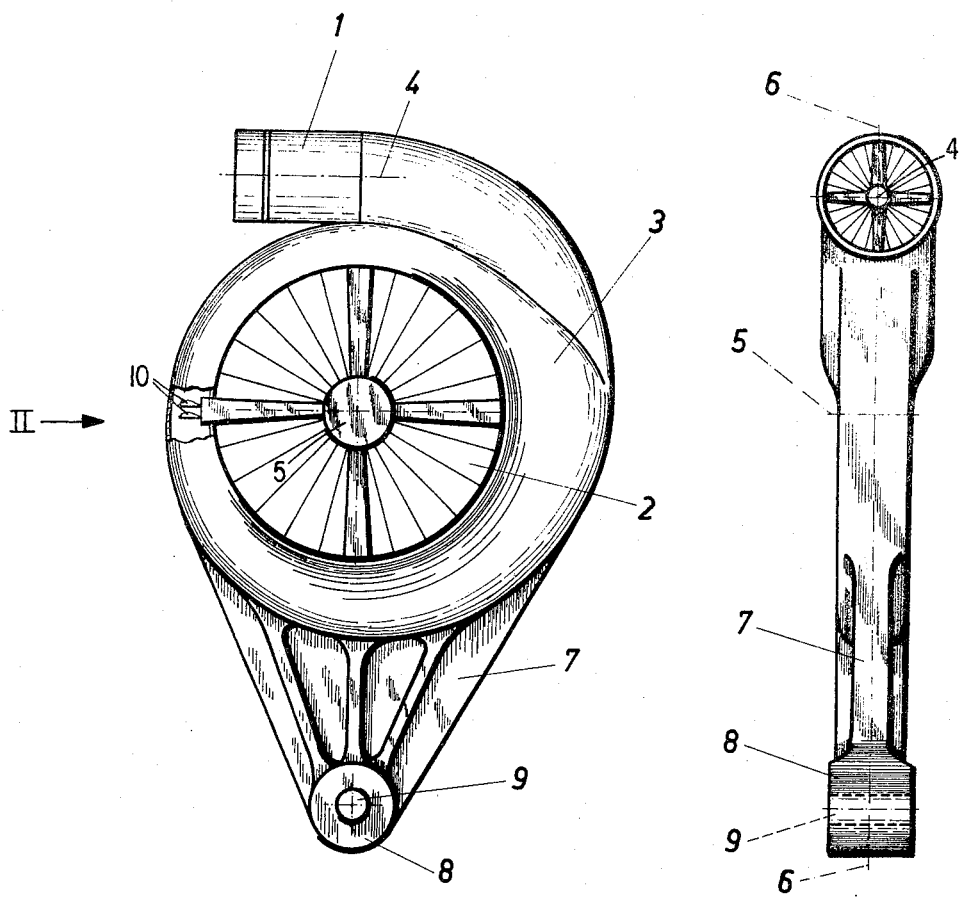
Fig. 1 is a plan view of a preferred embodiment of the present invention.
FIG. 2 is an elevational view, taken in the direction of the arrow II of FIG. 1.

FIGS. 1 and 2 show one embodiment of the present invention which includes a lifting fan 2 and a gas turbine 1 which are combined into a single structural unit and are so disposed relative to one another that the axis of the gas turbine shaft 4 is at right angles to the axis of the lifting fan shaft 5 and is approximately tangential to the periphery of the lifting fan housing 3.

A particular advantage of the arrangement according to the invention is that, compared with prior lifting drives, it is an extremely flat structure which permits its convenient installation in the area below the fuselage of a transport aircraft. The units are preferably mounted to be pivotal about a vertical axis or the lifting fan units are arranged to be telescoped out so that, in the retracted state, they can be accommodated in the area below the fuselage one above the other or in a juxtaposed arrangement.

There also results a reduction in weight for the gas generators, or turbines, compared with the total weight for a lifting fan assembly which is supplied with pressurized gas by cruising drive systems. The gas generators for a unit according to the invention can be specially designed for the power required to produce the lifting thrust. This permits the use, for example, of a shorter and smaller turbine compressor and, moreover, a lighter weight construction because of the shorter operating periods of the lifting system as compared with the cruising drive system. Any increase in the output of such lifting units would require hardly any increase in structural height since an increase in the length of the gas turbine would have no effect on the height of the assembly.

Although the lifting fan and gas turbine are combined, there remains the advantage of conventional lifting fans, i.e. their flat construction. Moreover, with slight modifications as regards the position of the gas turbine axis with respect to both the periphery and the plane of the lifting fan, improved installation conditions can be obtained. For example, the gas turbine can be offset with respect to the plane of the lifting fan blades either toward the top or bottom or in a tangential direction.

Most importantly, in arrangements according to the present invention, the above-mentioned hot gas lines, which would present additional weight and space requirements, are eliminated.

A further advantage is the aerodynamically favorable start-up conditions for the gas generators. The start-up losses are somewhat greater during vertical ascent as compared to lifting drive arrangements having an almost vertical start-up axis since the gas generator of the present invention is exposed to the flow from the side. The ascent speed during hovering, however, is very low and the drive mechanism sucks in air from all directions around it so that these losses have only a negligible effect. In contradistinction thereto, the horizontal arrangement of the start-up axis in the transition phase from vertical to aerodynamically supported horizontal flight (the so-called transition) results in decisive advantages since the drive mechanism according to the invention is here exposed to flow from the front.

With the perpendicularly installed lifting drives of the prior art, the lateral flow during transition results in substantial start-up interferences which can lead to great losses at transition speeds up to Mach 0.3. The installation of a plurality of lifting units one behind the other can bring about an improvement in the start-up conditions when the gas turbine axis is inclined or displaced with respect to the lifting fan plane.

Finally, the advantage, as regards safety, of such a drive system position is that no other gas generator will be damaged if one turbine plate explodes. With juxtaposed lifting drives, however, such an accident can result in the destruction of the adjacent lifting drives.

The gas turbine 1 of the illustrated embodiment may be a known single- or two-cycle power plant. The also known lifting fan 2, which is of a known type, is provided with a so-called blade tip turbine 10, also known, which is disposed concentrically with the fan shaft on the periphery of the fan blades. The exhaust gases from the gas turbine 1 are conducted through the helically constructed housing 3 and drive the blade tip turbine which itself drives the lifting fan 2 and thus produces the lifting thrust.

The structural unit for the two known elements 1 and 2 is formed by the common housing 3. Depending on the particular installation requirements, the construction of the housing may be modified in that the gas generator shaft axis 4 can be displaced in translation along median plane 6 of the fan in a direction toward or away from the fan axis 5, or the axis 4 can be pivoted out of its illustrated tangential orientation. On the other hand, the position of the gas turbine can also be changed by a displacement of its axis 4 out of the fan median plane 6 in the direction parallel to the fan axis 5, so that, for example, the periphery of the gas turbine becomes closed off by one frontal face of the fan housing. Such a construction could be of particular advantage for superposed lifting units in the area below the fuselage due to their low installation height.

Moreover, the housing 3 can be provided, depending on the type of bearing which it is to have in the cell structure, with an appropriate cover or, as here, with a pivot arm 7 which is given the required rigidity by an appropriate structural configuration, e.g. ribs, and which may be, if required, an integral component of the lifting fan unit. The arm carries a lug 8 provided with a bore 9 for a pivot bolt mounted on the side of the cell. The lifting unit can then be pivoted away from the fuselage contour for hovering flight and is pivoted back into the area below the fuselage during aerodynamically supported flight.

It will be understood that the above description of the present invention is susceptible to various modifications, changes and adaptations, and the same are intended to be comprehended within the meaning and range of equivalents of the appended claims.

I claim:

1. In a thrust producing arrangement composed of a lifting fan, a blade tip turbine connected to the fan blades and a gas turbine connected to produce a driving stream of gas for driving the blade tip turbine, the improvement comprising: a housing member carrying, and constituting the housing for, said fan and said gas turbine and including mounting means for connection to a support structure, said housing supporting said gas turbine so that its axis of rotation lies in a plane which is disposed perpendicularly to the axis of rotation of said fan and extends approximately tangentially to the periphery of the portion of said member which houses said fan, said mounting means being located on the opposite side of said fan axis from said gas turbine.

2. An arrangement as defined in claim 1 wherein said member houses the blade tip turbine and the interior of said member is shaped for guiding the gas stream produced by said gas turbine against the blade tip turbine.

3. An arrangement as defined in claim 2 wherein said mounting means are constructed for permitting said member, when mounted, to be pivoted about an axis parallel to the axis of rotation of said fan.

* * * * *